(No Model.) 3 Sheets—Sheet 1.

W. B. HOSFORD.
FRICTION CLUTCH.

No. 456,571. Patented July 28, 1891.

Attest

Inventor.
Wm B. Hosford (No Model.) 3 Sheets—Sheet 2.

W. B. HOSFORD.
FRICTION CLUTCH.

No. 456,571. Patented July 28, 1891.

Attest
D. C. Douda
C. W. Gill

Inventor
Wm. B. Hosford
By his atty
R. D. O. Smith (No Model.) 3 Sheets—Sheet 3.

W. B. HOSFORD.
FRICTION CLUTCH.

No. 456,571. Patented July 28, 1891.

Attest
D. C. Dunda
C. W. Gill

Inventor
Wm B. Hosford
By his atty
R. D. O. Smith

UNITED STATES PATENT OFFICE.

WILLIAM B. HOSFORD, OF MISHAWAKA, INDIANA.

FRICTION-CLUTCH.

SPECIFICATION forming part of Letters Patent No. 456,571, dated July 28, 1891.

Application filed March 23, 1891. Serial No. 386,173. (No model.)

*To all whom it may concern:*

Be it known that I, WILLIAM B. HOSFORD, of Mishawaka, in the county of St. Joseph and State of Indiana, have invented new and useful Improvements in Friction-Clutches; and I do hereby declare that the following is a full and exact description of the same, reference being had to the accompanying drawings, wherein—

Figure 1:
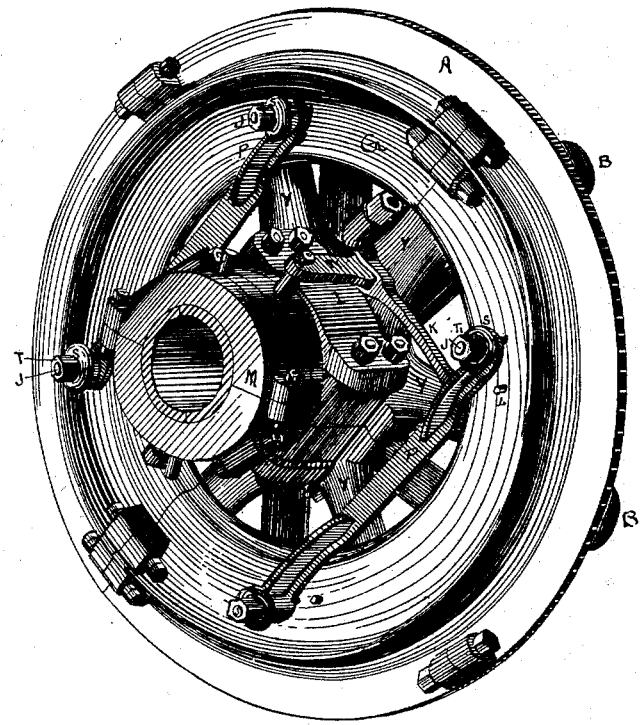
Figure 2:
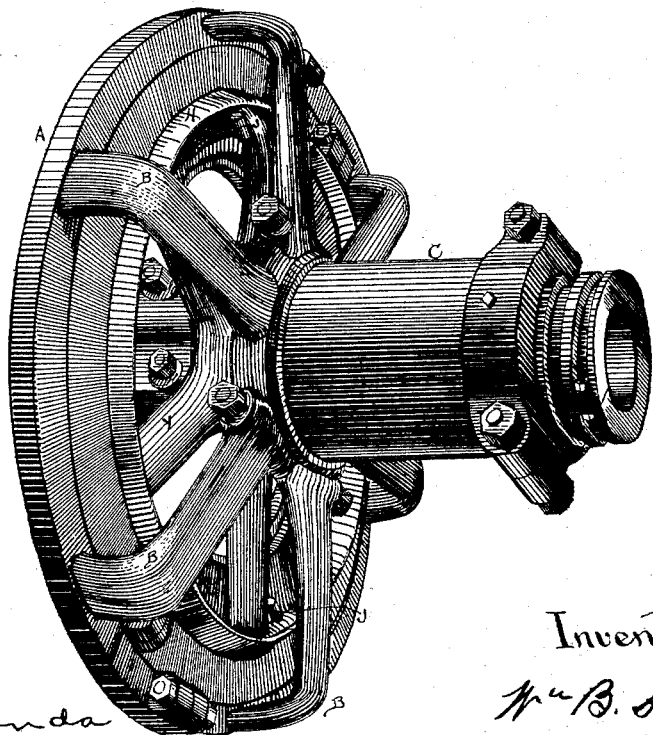
Figure 3:
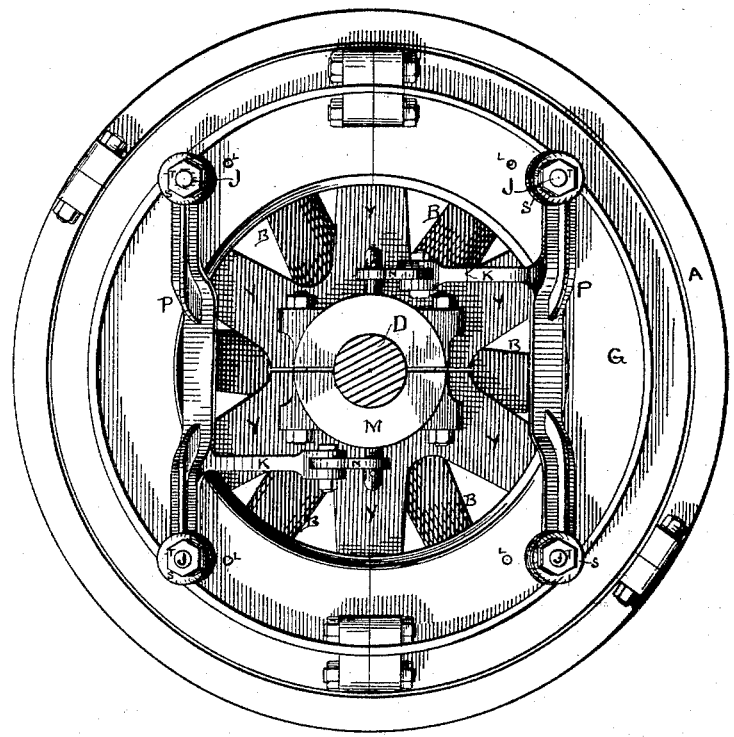
Figure 4:
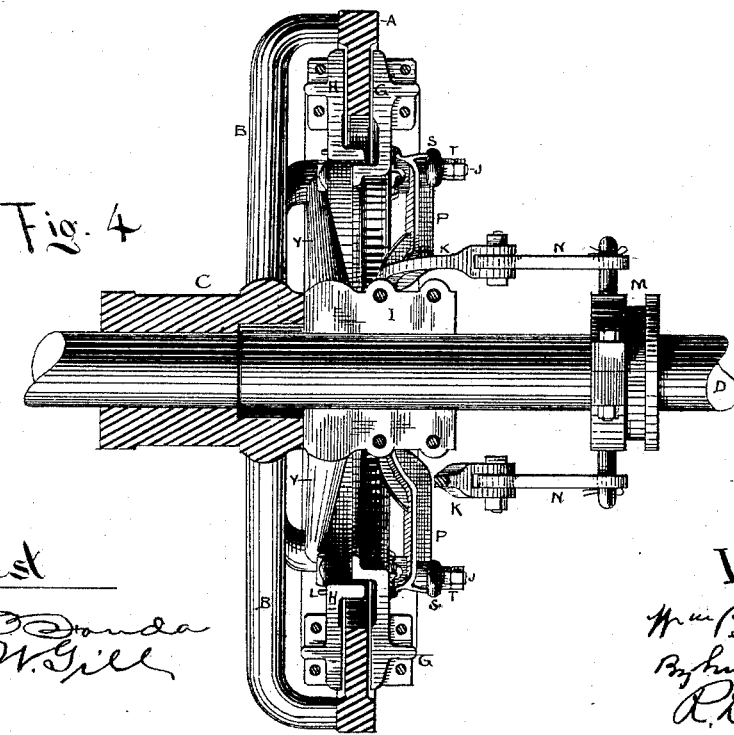
Figure 5:
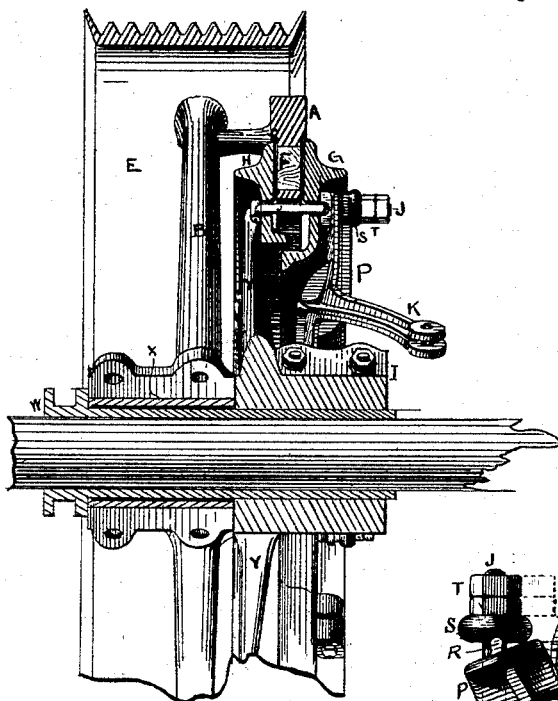
Figure 7:
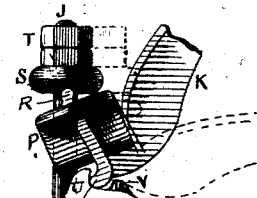
Figure 8:
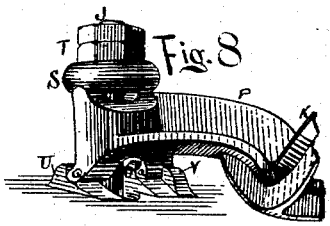
Figure 6:
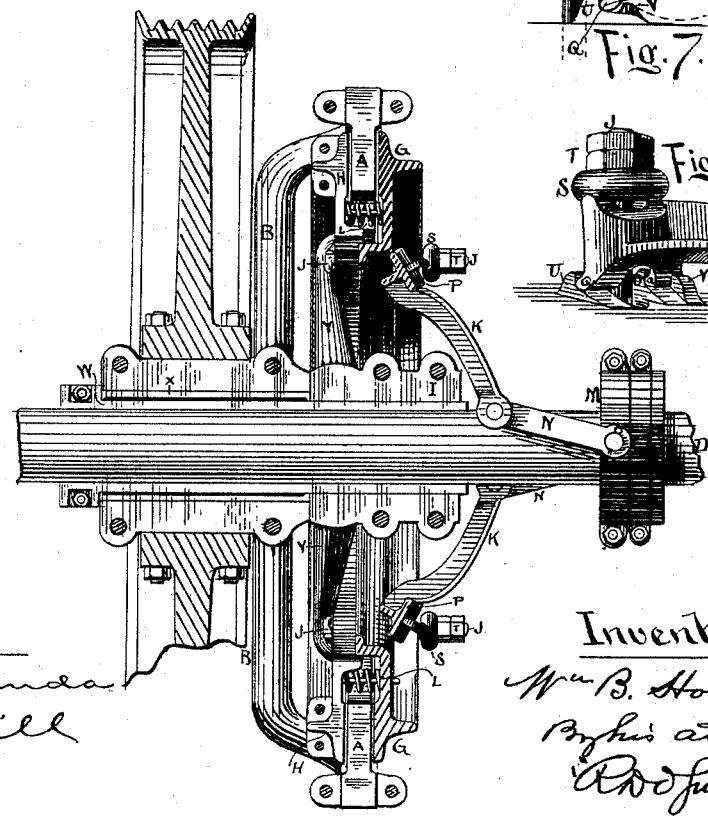

Figure 1 is a perpective view of my clutch from the front. Fig. 2 is a perspective view of the same from the back. Fig. 3 is a front elevation. Figs. 4, 5, and 6 are longitudinal sections of the clutch on different planes and showing different modes of applying the invention. Figs. 7 and 8 are different views of the toggle-lever.

Friction-clutches may be divided into several classes having different modes of action; but for the present purposes it will only be useful to speak of two classes, which have a mechanical action common to both, but arranged to operate by entirely different modes. In these two classes of clutches there is on one side a friction-ring and on the other side one or more sets of jaws, which are caused to close upon and grip said ring or to open and release it. In these particulars the mechanical action is the same; but in one class the friction-ring constitutes a hollow cylinder concentric with the axis of revolution, and in the other said ring stands in a plane perpendicular to said axis. This difference in the position of the friction-surface requires a corresponding difference in the direction of motion of the gripping-jaws and an opposite mode of action. In the first named the jaws move in a radial direction—that is to say, toward and away from the axis—and as a consequence the jaw on one side of the friction-ring is moved in opposition to centrifugal force and the jaw on the other side is moved in coincidence with said force; but, as one jaw revolves in a larger orbit than the other, these two forces cannot be caused to balance each other, and it is therefore always a disturbing force, increasing the difficulty of applying the clutch or increasing the difficulty of releasing it, as the case may be, and this difficulty increases with increase of speed. In this latter-named case the jaws move in a direction substantially parallel with the axis of rotation, and therefore, as they neither increase nor diminish their distance from said axis, they are at all times in equilibrium as to centrifugal force.

My invention relates to the last-named class of clutches; but I do not claim to have invented the distinctive feature referred to, it having been common to employ levers each having one gripping-point.

My present invention grips the ring at four points, but does so by a structural modification, which forms the subject of this patent.

In Figs. 1, 2, 3, and 4 the device is shown as a clutch-coupling. In Fig. 5 it is shown as a pulley-clutch, the friction-ring being attached to the pulley. In Fig. 6 is shown a clutch provided with a sleeve upon which the pulley is mounted.

A is the friction-ring attached to and supported by arms B B, which extend to and are attached to the hub C, which is loose as to the shaft D. In Figs. 1, 2, 3, 4, and 6 these arms B are independent of any pulley; but in Fig. 5 they constitute also the arms of the pulley E. The ring A may be solid or it may be a carrier for friction-surfaces composed of other material, as preferred. In Fig. 5 inserted wooden friction-blocks F are shown.

The friction-ring A is located between the jaw-rings G H, the latter of which is attached to and supported upon radial arms Y, which meet at the hub I, which is keyed or otherwise fastened to the shaft D. The ring G is retained in place by the bolts J, which pass through both of said rings and serve to clamp them upon the friction-ring. This latter effect is produced by the toggle action of the lever K, (see Fig. 7,) the bolts being conveniently provided at one end with T-heads, which rest in proper seats on the outer side of ring H, and at the other end, which passes through the lever K, with suitable nuts, whereby a desired initial position may be attained, as shown in Fig. 7. When said lever K is depressed, in conjunction with bolts J, it acts as a toggle to force the rings G H toward each other and with great pressure on the interposed friction-ring A. In this way said ring is gripped and caused to rotate with the gripping-jaws. When the toggle-pressure is released, springs L, Fig. 6, cause the rings to move out of contact with the friction-ring A. The levers K are connected with the shifter-ring M by means of the links N. The lever K is made with a cross-head P, at each end of which there is one of the bolts J passing through the jaw-rings and causing them to be gripped upon the friction-ring, as set forth above. The lever K therefore acts upon the jaw-rings at two points, which are terminals of a chord of the curve of the jaw-ring, and each lever effects a compression of the friction-ring at two points instead of one, as heretofore.

The organization which multiplies the number of points of compression enables me to lighten all the parts and to bring them also nearer to the center, both of which are advantages both in simplicity and economy of construction and in efficiency, because centrifugal force is diminished and less power absorbed in imparting motion to the parts.

The toggle end of the cross-head P is constructed substantially as shown in Figs. 7 and 8. The bearing-surfaces are in the form of two comparatively thin-edged ribs Q R, divided in the middle to permit the bolt J to pass through. The rib Q is seated on the ring G, and the rib R is seated on a washer S under the nuts T, by which the effective length of the bolt J may be increased or diminished for adjustment. By this means the motion of the toggle is substantially knife-edged or rolling on its bearings, and friction is reduced to the lowest attainable point. The toggle-seat on the ring is formed by two lugs V V, which are abutments to resist the thrust of the toggle part Q. With the knife-edge bearing no more is required for a seat. Retaining-lugs V prevent the toggle from slipping away from its place when pressure is released.

All the ring parts may be made in halves, so that they can be applied to a shaft already in its boxes, and when used as a pulley-clutch a bearing-sleeve W is placed next to the shaft and rigidly secured thereto. The loose part of the pulley or clutch runs upon this sleeve instead of upon the shaft, and when worn the sleeve can be easily replaced and the shaft remain undamaged.

To further protect the loose parts, I have provided the same with a babbitted bush X.

Having described my invention, I claim—

1. In a friction-clutch, a ring A and the lever K, connected with and operated by the shifter-collar M, said lever being provided with a cross-head and clamping members, whereby said lever grips the ring A at two points, substantially for the purpose set forth.

2. In a friction-clutch, a friction-ring A, levers K, each provided with a cross-head P, and clamping members at the extremities hereof, whereby each of said levers clamps said ring A at two points, substantially for the purpose set forth.

3. In a friction-clutch, the friction-ring A, the clamping-rings G H, the levers K K, with cross-heads P P, and the clamping-bolts J, substantially as set forth.

4. In a friction-clutch, the levers K and knife-edge bearings Q R, with the seat-lugs V, substantially as set forth.

W. B. HOSFORD.

Witnesses:
R. D. O. SMITH,
D. O. FONDA.